Patented Oct. 12, 1943

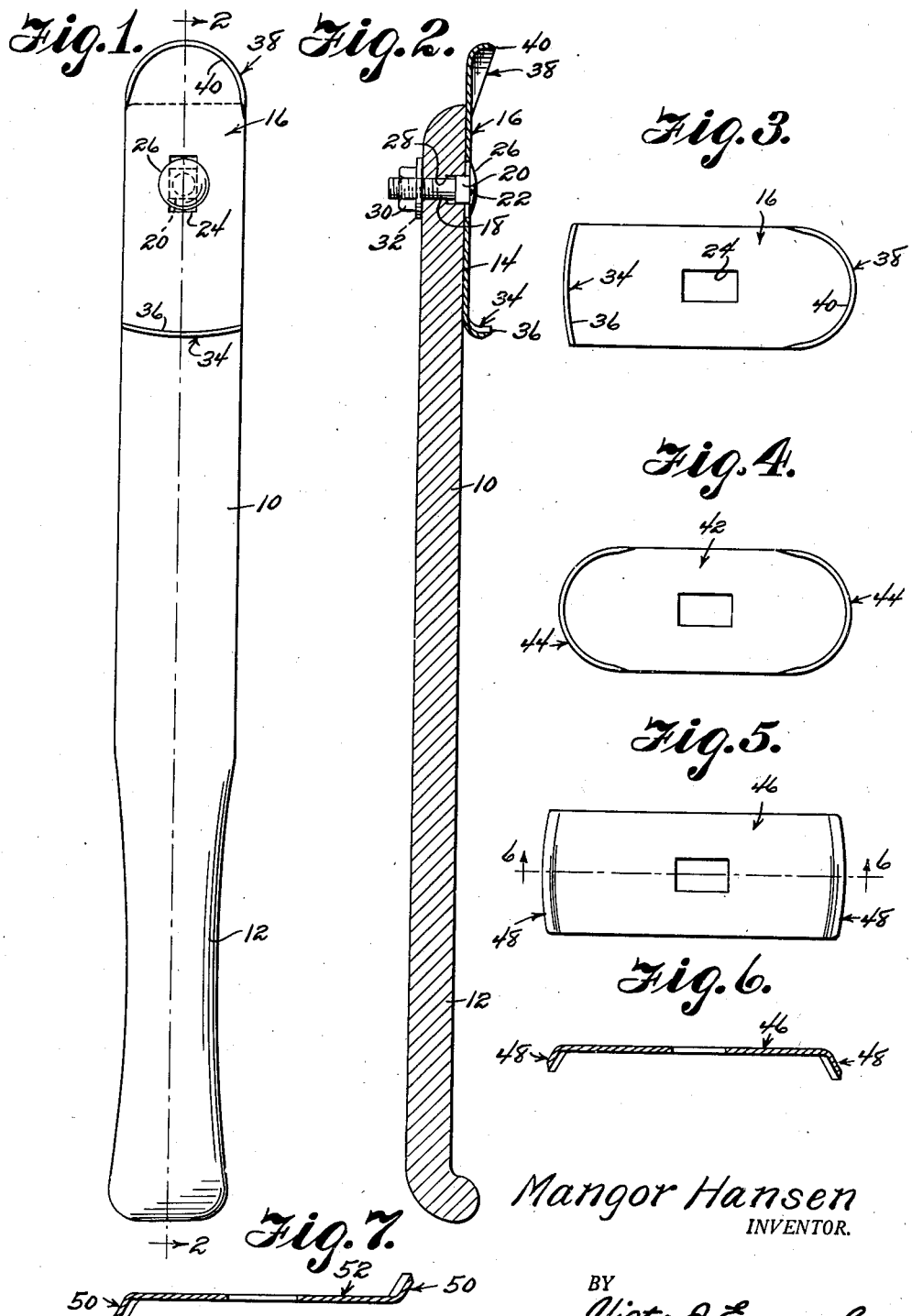

2,331,676

UNITED STATES PATENT OFFICE 2,331,676

SCRAPER

Mangor Hansen, Freeport, N. Y.

Application August 26, 1942, Serial No. 456,282

2 Claims. (Cl. 30—171)

My invention relates to scraping tools, and has among its objects and advantages the provision of an improved hand tool designed to facilitate the scraping of floors, stair structures, trim and the like, particularly in corner formations and recessed contours such as are present in practically all door and window frame structures.

In the accompanying drawing:

Figure 1 is a face view of a hand tool in accordance with my invention;

Figure 2 is a sectional view along the line 2—2 of Figure 1;

Figure 3 is a face view of a scraping blade;

Figure 4 is a face view of a modified form of scraper blade;

Figure 5 is a face view of another form of scraper blade;

Figure 6 is a sectional view along the line 6—6 of Figure 5; and

Figure 7 is a sectional view of a different form of scraper blade wherein the blade unit is provided with oppositely inclined scraper edges.

In the embodiment selected for illustration, I make use of a wood handle 10 contoured with a grip formation 12. This handle is substantially straight throughout its entire length and is provided with a flat blade-supporting face 14.

To the face 14 is clamped a scraper blade 16 through the medium of a bolt 18. This bolt is provided with a square body 20 fitting snugly in a square opening 22 in the handle 10, as well as in a rectangular slot 24 in the scraper blade 16. Thus the bolt 20 is restrained from rotation, and the scraper blade 16 may be adjusted a limited distance longitudinally of the handle 10 but is restrained from rotation about the axis of the bolt 18.

The opening 24 is located intermediate the ends of the scraper blade and the blade is clamped firmly against the face 14 by the bolt head 26 when the bolt is tightened. The bolt is of a length greater than the thickness of the handle 10 and fits snugly in a bore 28 arranged coaxially with the square 22. A nut 30 is threadedly connected with the bolt and includes a handle engaging flange 32 of considerable diameter. Thus tightening of the nut 30 clamps the blade 16 and the handle 10 into a unitary structure.

The blade 16 is provided with a scraper flange 34 at one end thereof and sharpened to a cutting edge 36. This flange is arranged at right angles to the longitudinal axis of the scraper blade 16 and is of slight curvature. The other end of the scraper blade 16 is formed with a semicircular flange 38 which tapers into the plane of the scraper blade 16, as illustrated in Figure 2. With the scraper blade 16 in the operative position of Figure 2, the flange 38 projects beyond the end of the handle 10, with the flange 34 lying some distance inwardly of this end of the handle. Either flange 34 or 38 may be employed by merely loosening the bolt 18 and turning the scraper blade to the desired position. A sharp cutting edge 40 is also provided on the flange 38.

The scraper blade 42 of Figure 4 differs from that of Figure 3 only in that both flanges 44 are of semi-circular contour. In Figure 5, the scraper blade 46 differs from the scraper blade 16 only in that the two flanges 48 are characterized by slight curvatures along the lines of the flange 34, with the flanges 48 bent to angular positions slightly less than right angles with respect to the plane of the scraper blade 46.

In the scraper blade of Figure 7, the flanges 50 project from the scraper blade 52 in opposite directions. In employing the scraper blade 52, it is necessary that the handle 10 have a formation shaped to accommodate one of the flanges 50.

A hand tool in accordance with my invention employs a relatively small amount of metal. The scraper blades are designed to scrape paint, varnish and the like in places where conventional scraping tools are not accessible. The relatively straight cutting flanges are suitable for corner and flat surface work, while the semicircular flanges operate effectively in concaved grooves and curved formations.

Without further elaboration, the foregoing will so fully illustrate my invention, that others may, by applying current knowledge, readily adapt the same for use under various conditions of service.

I claim:

1. A scraper tool comprising a handle, a blade of narrow elongated formation arranged on the handle with an end portion thereof extending forwardly beyond the handle, the blade being provided at its forward end with a scraper flange of substantially semicircular formation in plan and tapering towards its ends into the plane of the blade, substantially the entire portion of the blade extending forwardly beyond the handle, and a bolt securing the blade to the handle, the bolt passing through said parts and provided with a polygonal portion engaging said parts to hold them against turning movement one with relation to the other.

2. A scraper tool comprising a handle, a blade arranged on the handle with an end portion thereof extending forwardly beyond the handle, the blade being provided at its forward end with a scraper flange of substantially semicircular formation in plan and tapering towards its ends into the plane of the blade, the entire scraper flange extending forwardly beyond the handle, and means securing the blade to the handle.

MANGOR HANSEN.